Dec. 27, 1960  L. W. BURFIELD ET AL  2,966,110
PORTABLE AERATION UNIT FOR GRAIN IN STORAGE
Filed April 18, 1958
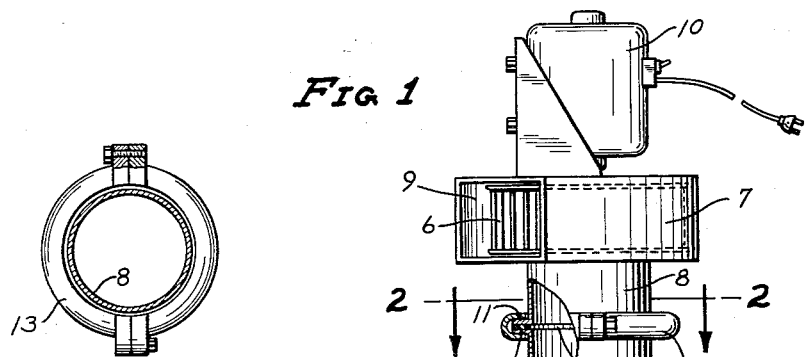
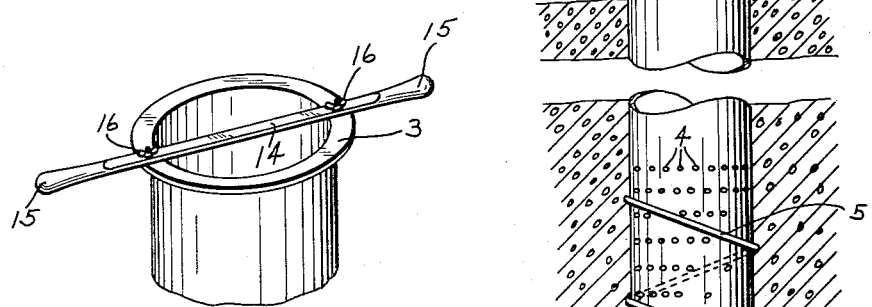
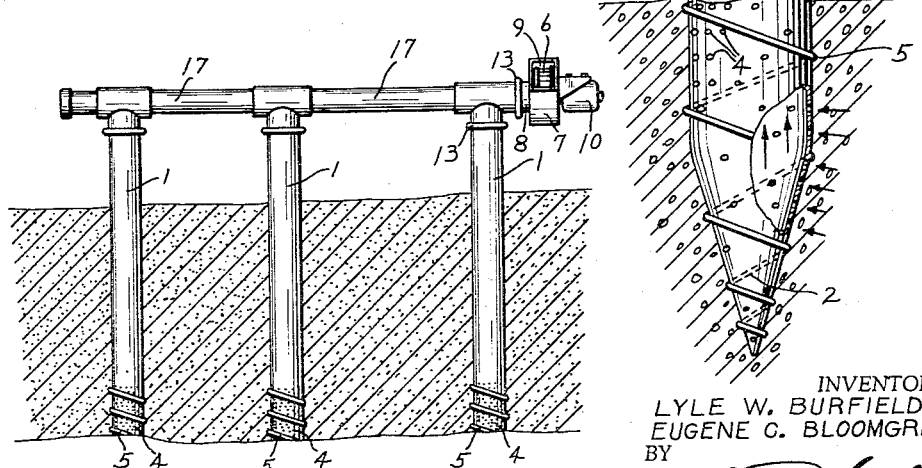
INVENTORS
LYLE W. BURFIELD
EUGENE C. BLOOMGREN
BY
ATTORNEYS

United States Patent Office 2,966,110
Patented Dec. 27, 1960

2,966,110

PORTABLE AERATION UNIT FOR GRAIN IN STORAGE

Lyle W. Burfield and Eugene C. Bloomgren, Minneapolis, Minn., assignors to Gerber Sheet Metal Incorporated, Minneapolis, Minn., a corporation of Minnesota Filed Apr. 18, 1958, Ser. No. 729,311

1 Claim. (Cl. 98—57)

Our invention relates to devices for aerating of stored grain to prevent overheating and spoilage thereof. Much stored grain is spoiled each year due to overheating of certain areas deep in the storage bin where the air under normal conditions does not circulate. These areas, usually called "hot spots," are caused by excessive moisture content in the grain.

The primary object of our invention is the provision of a power-operated suction fan and conduit means and one or more relatively rotatable tubular aerating pipe point attachments therefore which may be quickly rotated as required to screw the threaded pipe point to the desired inserted depth into the grain pile whereby to remove the hot moist air from the grain so as to prevent spoilage.

A further object of our invention is the provision of a device of the class described which is inexpensive to construct and which is extremely easy to use.

A further object of our invention is the provision of a device of the class described which is light in weight and which may be connected to a portable electric suction fan or the like in any relatively rotated and screwed down position of the tubular aerating point.

The above and still further objects of our invention will become apparent from the following detailed specification, appended claim and attached drawings.

Referring to the drawings wherein like characters indicate like parts throughout the several views:

Fig. 1 is a view in side elevation of our novel device, some parts being broken away and some parts shown in section;

Fig. 2 is a view in transverse section as seen from the line 2—2 of Fig. 1;

Fig. 3 is a fragmentary perspective view of the upper end portion of the pipe of our novel structure with the power fan removed and with a rotating handle attached thereto; and Fig. 4 is a view in side elevation showing a modified form of the structure illustrated in Fig. 1.

Referring with greater particularity to the drawings, the numeral 1 indicates an elongated cross-sectionally circular ventilating and/or aerating pipe having a pointed tip 2 at its extreme lower end and a radially outwardly projecting circumferentially extending flange 3 at its upper end. The lower end portion of the pipe 1 including the tip 2 is formed to provide a plurality of circumferentially and longitudinally spaced inlet apertures 4 of a size to permit passage of air therethrough but prohibiting the passage therethrough of the particular grain being aerated. The perforated lower end portion of the pipe 1, including the pointed tip 2, is also provided with a generally spiral rib or thread 5 which projects radially outwardly therefrom, whereby such aeration unit or units may be desirably screwed into a compact body of grain, to a required depth.

Detachably and rotatably securable to the annularly flanged upper end portion 3 of the rotatable pipe 1 is a similarly flanged annular pipe connection for a source of vacuum such as the suction fan 6, preferably and as shown of the sirocco type. The fan housing is identified by the numeral 7, the annularly flanged tubular air inlet pipe by the numeral 8 and the outlet port by the numeral 9. An electric motor 10 attached to the housing 7 in axially opposed relationship to the air inlet pipe 8 imparts rotation to the fan 6. As shown in Fig. 1, the air inlet pipe 8 corresponds in diameter to the pipe 1 and is provided at its lower end with a radially outwardly projecting circumferentially extended flange 11 which corresponds to and overlies the similar annular flange 3 on the upper end of the pipe 1. A compressible annular washer 12 is preferably interposed between the flanges 3 and 11 to effect a seal when the annular clamping collar 13 which is U-shaped in cross-section is clamped thereabout, as shown in Fig. 1. From the foregoing it will be apparent that a flanged aeration pipe point section may be rotated relative to a similarly flanged pipe section 8 and connected in any such relative rotative position by a coupling collar 13 as shown.

When it is desired to draw off moisture ladened heated air from a hot spot in the grain, or alternatively to aerate stored grain to prevent hot spots, the pipe 1, with or without the fan 6 detached therefrom, is inserted manually by rotation thereof to screw the threaded perforated, point down into the grain from the top of the bin. Under conditions where the grain body is greatly compacted and it is desirable to screw the aeration point or points to considerable depth in the body as shown in both Figs. 1 and 3, a handle 14 having hand grips 15 projecting on opposite ends thereof may be detachably secured to the flange 3 of an aeration pipe point 1 by any suitable means such as nut-equipped bolts 16 which project through aligned apertures, not shown, in the handle 14 and flange 3. When the operator grasps the hand grips 15 of the handle 14 and imparts rotary movements to the pipe 1, from left to right with respect to Fig. 1, the spiral rib or thread 5 will cause the perforated lower end of the pipe to screw itself down through the body of grain and reach any desired level in the grain with a minimum of effort. When this level has been reached and the handle 15 has been used for this purpose it may then be detached from the separable flange portion 3, and the fan 6 is again attached, as shown in Fig. 1, and rotary sucking movements are imparted to the fan 6 through the motor 10. It will be apparent from the foregoing that the perforated and threaded aeration pipe point 1 may be further rotated at any time in the body of grain as shown, as a result of which the grain will be loosened about the point by the threads and even agitated if desired. In this manner, the moisture and/or heated air is removed from the body of compacted grain and replaced by fresh air which is forced downwardly through the mass due to the differential in air pressure created by the fan 6.

In the modified structure of Fig. 4, a plurality of relatively rotatable aeration pipes 1 are shown similarly connected to a horizontally disposed connecting manifold 17 and by this arrangement a considerably greater area of the grain mass may be aerated than with the single pipe arrangement of Fig. 1.

Our invention has been thoroughly tested and found to be completely satisfactory for the accomplishment of the above objects and while we have shown a preferred embodiment thereof, we wish it to be specifically understood that same is capable of modification without departure from the scope and spirit of the appended claim.

What we claim is:

In a portable aeration device for grain in storage, comprising an elongated tubular aeration pipe section having a pointed tip at its lower end, the lower end portion of said pipe adjacent said tip being provided with a spiral thread acting rib projecting radially outwardly therefrom and having a plurality of circumferentially and longitudinally spaced inlet apertures disposed between the spiral thread acting rib portions, the upper end of said aeration pipe section terminating in an annular flange, a second pipe section also terminating in an annular flange for mating rotative engagement with the similar flanged end of said aeration pipe section, a coupling collar substantially U-shaped in cross-section surrounding the engaged flanges of said pipe sections, and a source of vacuum connected to said second pipe section to draw air through the apertures in said aeration pipe section, whereby said sections may be relatively rotated during operation thereof.

References Cited in the file of this patent

UNITED STATES PATENTS

| | | |
|---|---|---|
| 2,192,732 | Johnson | Mar. 5, 1940 |
| 2,466,362 | Blake | Apr. 5, 1949 |

FOREIGN PATENTS

| | | |
|---|---|---|
| 2,029 | Great Britain | 1866 |
| 614,965 | France | Dec. 27, 1926 |
| 176,548 | Switzerland | Apr. 30, 1935 |
| 586,324 | Great Britain | Mar. 14, 1947 |